June 28, 1949.　　　　J. A. MacLEOD　　　　2,474,537
POSITION INDICATOR FOR AIRCRAFT
Filed March 29, 1946　　　　　　　　　　　3 Sheets-Sheet 1
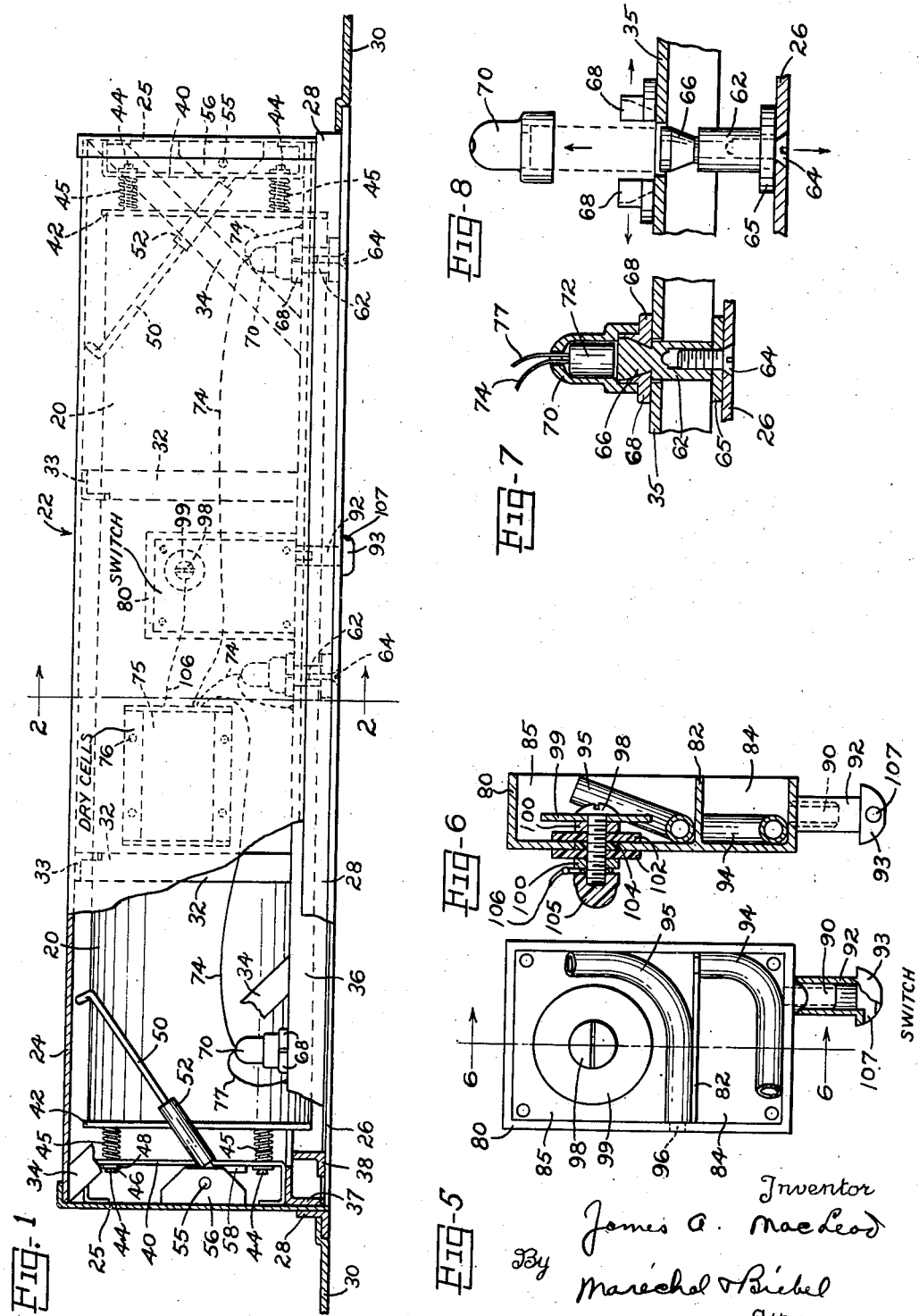
Inventor
James A. MacLeod
By Maréchal & Biebel
Attorneys June 28, 1949.                    J. A. MacLEOD                         2,474,537
                          POSITION INDICATOR FOR AIRCRAFT
Filed March 29, 1946                                          3 Sheets-Sheet 2
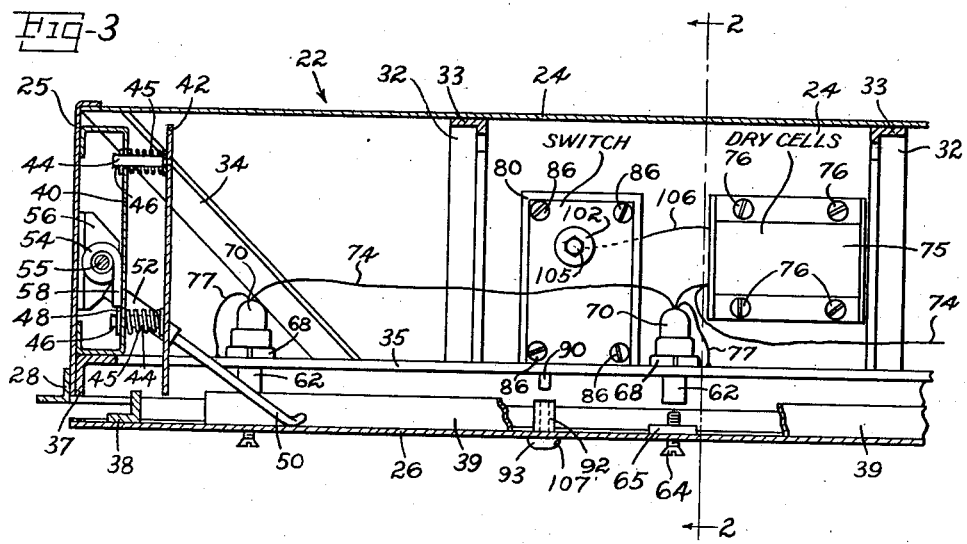
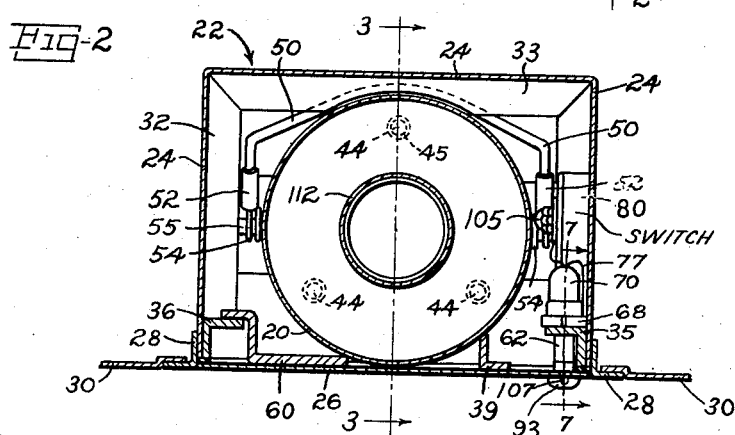
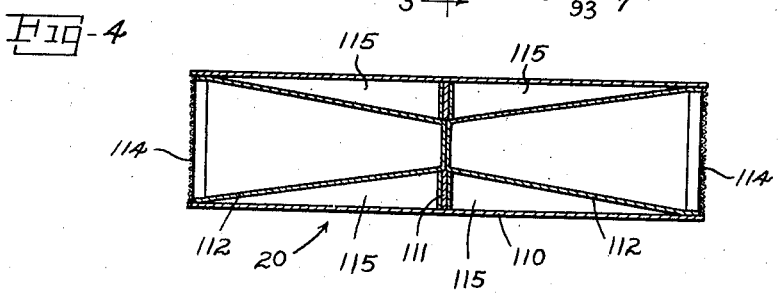

June 28, 1949.　　　　　J. A. MacLEOD　　　　　2,474,537
POSITION INDICATOR FOR AIRCRAFT
Filed March 29, 1946　　　　　　　　　　　　　　3 Sheets-Sheet 3
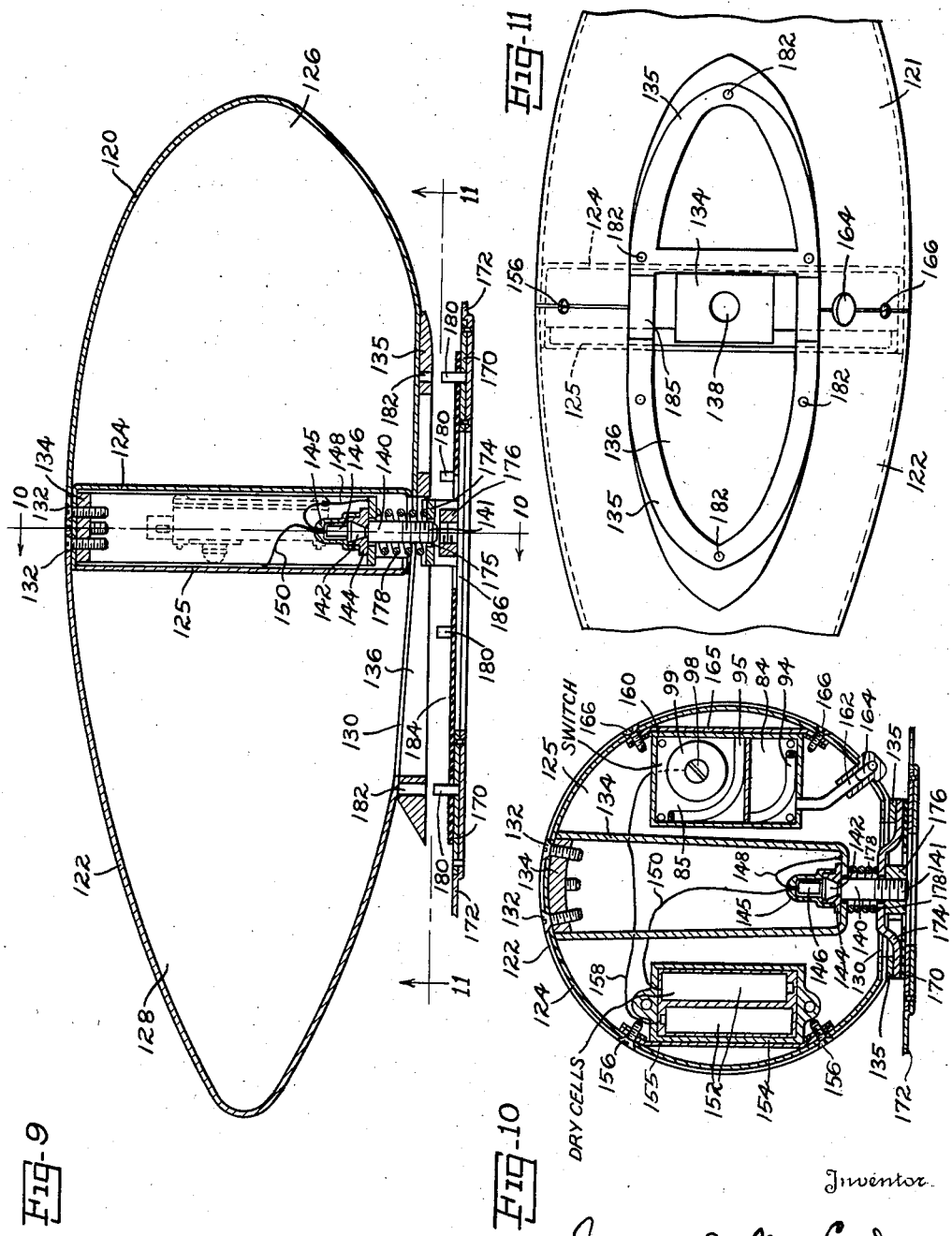
Inventor
James A. MacLeod
By Maréchal & Biebel
Attorneys Patented June 28, 1949

2,474,537

UNITED STATES PATENT OFFICE 2,474,537

POSITION INDICATOR FOR AIRCRAFT

James A. MacLeod, New York, N. Y., assignor to Sun Chemical Corporation, New York, N. Y., a corporation of Delaware Application March 29, 1946, Serial No. 658,185

11 Claims. (Cl. 177—329)

This invention relates to apparatus suitable for use on an aircraft for carrying a composition effective in the event of crash landing on water to color the surrounding water as a guide to finding the aircraft.

In connection with the increased use of aircraft for long flights over water, it is highly desirable to provide some means to assist in fixing the position of such aircraft in the event that it is forced to crash upon the water during such flight. This may be done, for example, by releasing into the water surrounding the aircraft a material adapted to impart thereto a color readily distinguishable from the normal color of the water, particularly as seen from above from another aircraft.

One of the principal objects of this invention is the provision of effective apparatus for use in connection with such water marking operations, which is definite and certain in the carrying of the water marking material and in causing its contact with the water to insure proper release of the marker material.

Another object is to provide a container device for carrying water-marking material in or on an aircraft and for release to accomplish the water marking in the event of crash landing on water.

Another object is to provide such a container device which will operate when brought into the water to release water-marking material at a controlled slow rate and thereby to maintain effective marking of the water, and hence the position of crashing of the aircraft, over an extended period of time to facilitate spotting and rescue operations.

Another object is to provide a container device for water-marking material which may be mounted in or on an aircraft and adjacent the outer surface of the aircraft, and which upon the crashing of the aircraft in water will automatically be discharged into the water from its mounted position and will release its water coloring contents into the surrounding water at a predetermined rate.

Another object of the invention is to provide apparatus for mounting a container of water-marking material in or on an aircraft which will retain the container inoperative during flight and normal operation of the aircraft and guard against premature release but which upon crashing in water will automatically effect positive disengagement of the container from the aircraft and eject the container into the surrounding water to release its water coloring contents.

Another object is to provide such a container device having mechanism for effecting its positive disengagement from an aircraft or other vehicle whereon it is mounted and having also a switch device adapted to fill with water in the event of a crash landing of the aircraft on water and operative upon the introduction of a predetermined volume of water to actuate the disengaging mechanism.

Other objects and advantages of the invention will be apparent from the following description, the accompanying drawings and the appended claims.

In the drawings, in which like reference characters designate like parts throughout—

Fig. 1 is a side elevation, partly broken away, illustrating a container of water-marking material and ejector apparatus therefor, mounted within an aircraft;

Fig. 2 is a sectional view taken substantially on the line 2—2 in Fig. 1, and also in Fig. 3;

Fig. 3 is a partial view in section substantially on the line 3—3 in Fig. 2, with the container of water-marking material removed and one panel dropped away;

Fig. 4 is a longitudinal section of the container of water-marking material shown in Figs. 1 and 2 but on a reduced scale;

Fig. 5 is an enlarged detail view in side elevation of the switch device shown in Figs. 1 to 3;

Fig. 6 is a section taken substantially on the line 6—6 in Fig. 5;

Fig. 7 is an enlarged detail view taken in section substantially on the line 7—7 in Fig. 2;

Fig. 8 is an exploded elevational view of the elements shown in Fig. 7;

Fig. 9 is a partially exploded view in longitudinal section showing a modified form of container and ejector apparatus mounted on the exterior of an aircraft;

Fig. 10 is a transverse section taken substantially on the line 10—10 in Fig. 9 with the parts assembled; and Fig. 11 is a partial elevational view taken approximately on the line 11—11 in Fig. 9 and showing the water-marking device after disengagement from an aircraft.

A preferred embodiment of the invention in which the container for the water marking material is mounted inside the structure with the outer panel flush with, or as a part of the skin or covering of the body of an airplane, is shown in Figs. 1–8 and in this embodiment the container device comprises a container 20 of water-marking material which is mounted within base or casing 22, shown as a box-like structure comprising side walls 24, end walls 25 and one open side which is normally closed by cover panel 26 separable from the remainder of casing 22. Angle 28 rims the open side of casing 22 and also provides convenient means for attachment to the fuselage 30 or other structural portion of an aircraft, as by welding or bolting to any suitable exposed surface thereof. Casing 22 is shown as mounted within fuselage 30, with the outside of panel 26 preferably substantially flush with the outer skin thereof to minimize air resistance. The interior of casing 22 is shown as reinforced by means of a plurality of angles 32, 33, 34, 35, 36, and 37, and panel 26 is similarly reinforced by means of angles 38 adjacent each end and an angle 39 running substantially the length of the panel. The inner edges of angles 33 opposite panel 26 are partially cut out to provide a seat for container 20, as shown particularly in Fig. 2. All these elements are preferably formed of a light metal such as aluminum and all fixed connections therebetween are preferably formed by welding.

The inner surface of each of end walls 25 has secured thereto as by welding one of a pair of stirrup members 40. A plate 42 is resiliently mounted on each of stirrups 40, as by means of a plurality of pins 44 carried by each of plates 42 and slidable through complementary apertures in its associated stirrup 40 against the pressure of springs 45. The outer end of each of pins 44 is preferably peened or otherwise treated as indicated at 46 to prevent withdrawal from stirrups 40, and washers 48 may also be provided at this point if desired. When container 20 is to be mounted within casing 22, plates 42 are spread apart against the pressure of springs 45 and the container placed therebetween. When the plates are then released, they tend to move toward each other and thus hold the container within the casing until it is expelled therefrom by means of the mechanism next described.

At each end of casing 22 there is mounted a yoke member 50, the ends of which are joined by means of sleeves 52 to one end of each of coil springs 54 mounted on rod 55, the latter being shown as held by a pair of small angles 56 welded or otherwise rigidly secured to the inner surface of end walls 25. The other end 58 of each of springs 54 rests against the inner surface of stirrup 40, and these springs are wound in such manner that they exert tension on yokes 50 tending to force them downward from the positions indicated in Fig. 1 to the position indicated at the left in Fig. 3. When container 20 is mounted in casing 22, it is forced in against the pressure of springs 54 and carries yokes 50 inwardly to the positions shown in Fig. 1, and it is retained within the casing by means of panel 26 as will be described.

Panel 26 has secured thereto a plurality of Z-shaped bar members 60, the free ends of which are hooked over angle 36 to provide a hinge axis between panel 26 and the remainder of casing 22. Along its opposite side, panel 26 has secured thereto a plurality of stud members 62 as by means of screws 64 and spacer members 65. The opposite end of each of studs 62 extends through angle 35 of casing 22 and includes a tapered portion 66. Elements 68 are two-piece ring members tapered on the inside to coincide with tapered portion 66 of studs 62, as is shown particularly in Figs. 7 and 8. The two halves of each of elements 68 are held together by engagement within a complementary recess in one of cap members 70, each of which also contains an explosive charge 72 such for example as a conventional cannon primer. Wire 74 leads from explosive 72 to a small casing 75 which contains a plurality of dry cell batteries in series, or other suitable source of power, and is secured to side wall 24 of casing 22 as by means of screws 76, spot welding or the like. Wire 77 from explosive 72 is secured in any suitable way to the body of casing 22 to serve as a ground.

To prepare the device for use, studs 62 are mounted as described in angle 35 before panel 26 is secured in position. Container 20 is forced into the casing against yokes 50, and panel 26 is pivoted about the junction between Z-bars 60 and angle 36 to close the casing. With the parts so assembled, container 20 will seat in the complementary grooves in angles 33, and at its opposite side will similarly seat between angle 39 and the inner ends of Z-bars 60, this arrangement being most clearly seen in Fig. 2. The assembly may then be completed by securing panel 26 to studs 62 by inserting and tightening screws 64. This arrangement will retain the parts in the relative positions shown in Figs. 1 and 2 so long as studs 62 remain secured both to angle 35 in the body of the casing and to panel 26 by means of screws 64, and it will be seen that studs 62 are under continual axial tension from the force of springs 54 exerted on panel 26 through yokes 50 and the body of container 20. If, therefore, caps 70 are removed from rings 68, as by detonation of explosive charges 72, this tension on studs 62 will cause the two halves of rings 68 to be forced apart, thus disconnecting studs 62 from panel 35 and permitting them to drop free, this operation being illustrated in Fig. 8. This in turn leaves panel 26 free to pivot at the connection between Z-bars 60 and angle 36 and to fall away from casing 22, and the pressure of yokes 50 on container 20 will force panel 26 to open in this manner and then positively eject the container from within the casing.

The invention provides switch means so constructed as to insure operation of the device as described above in the event of forced landing on water by the aircraft carrying the device and also to insure against premature release of container 20 during normal operation of said aircraft. Switch casing 80 is divided by panel 82 into a plurality of chambers 84 and 85 and is sealed to casing wall 24 as by means of screws 86 and a suitable gasket. Communication between switch chamber 84 and the outside atmosphere is provided by tube 90 which extends out from chamber 84 and engages within a hollow tube 92 having a head portion 93 which is positioned on the outside of panel 26. A tube 94 is positioned in casing 80 with one end opening into chamber 84 and its other end communicating with chamber 85 through an appropriate aperture in panel 82, and tube 95 in chamber 85 provides an air vent through casing 80 as indicated at 96. Bolt 98 carrying disk 99 of copper or other good conducting material is mounted through the wall of switch case 80 into chamber 85. Bolt 98 is secured to the casing wall by nuts 100, but it and disk 99 are insulated therefrom by means of washer members 102 and 104 of phenolic plastic or other non-conducting material. Cap 105 of phenolic plastic or the like secures to bolt 98 a wire 106 leading to the batteries within casing 75.

When the device is mounted on an aircraft in the manner shown in Fig. 1, the head of tube 92 is preferably turned so that the open end 107 of the channel therein is facing away from the normal direction of flight in order to prevent water from entering this channel as a result of flying through rain, splashing through puddles or the like, and it should also be noted that it is desirable to choose a location for the mounting of the device on the aircraft such as to minimize the danger of container 20 being trapped in the event of a rapid sinking and so to insure its being thrown free. When the aircraft settles in the water in the course of a crash landing, water will enter switch compartment 84 through tubes 92 and 99 but will not reach chamber 85 until chamber 84 is substantially full. This arrangement minimizes the possibility of operation of the switch as a result of accidental introduction of water. After chamber 84 is substantially full, water will begin to enter chamber 85 through tube 94, and when the level of water in chamber 85 has risen sufficiently to reach disk 99, the circuit will be closed from the batteries in case 75 to explosive charges 72 and the latter will detonate. The result of the latter operation has already been described, and it will accordingly be seen that the operation of the above switch device insures that within a short time after the forced landing on water of an aircraft carrying this apparatus, container 20 will be positively ejected from casing 22 and blown into the surrounding water.

Fig. 4 illustrates the structural details of a container 20 found satisfactory for the practice of the invention. Outer casing 110 is an open-ended tube of aluminum or other light metal and carries a spacer element 111 of plywood or like material centrally disposed therewithin. Cup members 112 of aluminum or the like are formed generally in the shape of the frustum of a cone open at the base end thereof and are forced into casing 110 with their small ends engaging in a complementary aperture in spacer member 111. The open ends of cups 112 are preferably provided with screens 114 of copper or like material for the purpose of retaining the water-marking composition used therein. The above construction also provides a pair of annular air chambers 115 between cups 112 and casing 110 which serve to give buoyancy to the container in order to reain it at the surface of the water while the water-marking composition therein is being used, and it is desirable to insure tightness of chamber 115 by welding or otherwise sealing the joints between cups 112 and tube 110.

An example of water-marking material found useful in the practice of the invention with container 20 is a water soluble dyestuff material such as the soluble salt of fluorescein known as uranine, which when dissolved in water produces a greenish yellow coloring visible from relatively great distances and heights. Satisfactory results in the practice of the invention have been obtained by combining uranine with a water soluble binding agent such for example as polyvinyl alcohol, a solid polyglycol or the like. For example, the charge within cups 112 may comprise a mixture of approximately 87 parts uranine, 1 part polyvinyl alcohol and 12 parts water thoroughly mixed and molded together at room temperature. In connection with this composition, reference is made to copending application of MacLeod and Hodgkiss, Serial No. 658,184, filed March 29, 1946.

It has been found that compositions of the above type in general dissolve at a substantially uniform rate per square inch of surface exposed to the water, but they also tend to become more or less honeycombed, which results in increasing the exposed surface area and so accelerates dissolution. It is accordingly desirable to provide means for preventing this progressive increase in the exposed surface as dissolution proceeds, and this is taken care of by the conical shape of cups 112 in Fig. 4. For example, if each of cups 112 is approximately 4 inches in diameter at the open end, 1.5 in diameter at the closed end, and approximately 7.5 inches in depth, each will hold approximately three pounds of the above composition and the latter will dissolve at a substantially uniform rate for a period of approximately 16 hours while the container is floating in water. The size and shape of the container of the invention may readily be varied within the above principles to meet different conditions.

An embodiment of the invention wherein the container for the water-marking material is mounted on the outside of an aircraft is an embodiment shown in Figs. 9 to 11. The main body of the device comprises a pair of hollow shell members 120 and 122 of aluminum or other light material of adequate stiffness. Shell 120 is closed at its open end by pan member 124, the open side of which is covered by a similarly shaped pan element 125. Shell 120 and pan 124 combine to form an air tight compartment 126 which gives buoyancy to the device, and shell 122 and pan 125 form a similar compartment 128 suitable for retaining a water-marking composition, but shell 122 is cut away along the flattened side thereof to provide an open space 130 through which water can enter the compartment and reach the water-marking composition therein and which may be provided with a wire cover similar to screens 114 in Fig. 4. These elements are secured by means of screws 132 to one end of stirrup member 134, and it may also be found desirable to weld the joints therebetween. Plate member 135 of aluminum or like material is screwed or otherwise secured to the flattened side of shells 120 and 122, and contains an open portion 136 coinciding with opening 130 in shell 122 but sufficiently larger, as shown particularly in Fig. 11, to provide access to stirrup 134.

At its end adjacent the open side of the device, stirrup 134 is provided with a circular aperture 138 adapted to receive stud member 140, which has one end 141 threaded but is otherwise similar in construction to studs 62 already described and is similarly provided with a tapered end portion 142, two-piece ring element 144, and a cap 145 similar to cap 70 and containing a similar explosive charge 146. Wire 148 leading from explosive 146 serves as a ground, as indicated in Fig. 10, and wire 150 leads to batteries 152 within case 154 similar to battery case 75 in Figs. 1 and 3. Case 154 is secured in any suitable way to metal strap 155 which is in turn mounted on the rear wall of the device as by means of screws 156. Wire 158 leads from the batteries to switch case 160, which corresponds to switch case 80 in Figs. 1 to 3, 5 and 6. The component elements within switch case 160 are substantially the same as those in switch case 80 and are similarly numbered, with the exception of tube 162 which corresponds to tube 90 but is somewhat longer and extends out to engage within hollow tube 164 corresponding to tube 92 and similarly mounted on the outside of the casing. Switch casing 160 is welded or otherwise secured to metal strap 165 similar to strap 155 and similarly mounted as by means of screws 166 within the casing.

Figs. 9 and 10 illustrate means for securing the above described device to an aircraft. Plate 170 is secured as by welding, riveting or the like to the fuselage 172 or other structural portion of an aircraft, with its uppermost surface in Figs. 9 and 10 preferably substantially flush with the outer skin of the aircraft. Stirrup member 174 is welded or otherwise secured to plate 170 and is provided with an aperture 175 adapted to receive the free end of stud 140, which is threaded and engages nut 176 on the inner side of stirrup 174. Coil spring 178 surrounds stud 140 and is axially compressed and held under tension between the outer ends of stirrups 134 and 174 when the device is in position on an aircraft as shown in Fig. 10. Pins 180 carried by plate 170 engage in complementary apertures 182 in plate 135 to locate the device in proper position. A rubber or other suitable gasket means 184 may be provided between plates 135 and 170 for the purpose of sealing the interior of the device during normal operation of the aircraft whereon it is mounted. It will also be noted that the outer surface of plate 135 is partially cut away at 185 to accommodate the outer ends of stirrup 174 when the device is assembled in position and that plate 170 is provided with a cut away portion 186 in order to permit ready access to nut 176 for assembly purposes.

The operation of the above described embodiment of the invention is similar to that described in connection with Figs. 1–8. If the aircraft whereon the device is mounted is forced to crash on water, the water will enter switch casing 160 through tube 164 and tube 162 until it sufficiently fills chamber 85 to close the circuit through disk 99 to batteries 152 and detonate explosive charge 146. Cap 145 will then be blown free of ring element 144, the two halves of the latter will be free to separate, and since tapered end 142 of stud 140 will then be free to pass through hole 138, spring 178 will expand and force the device away from stirrup 174. After this occurs, stud 140 will remain secured to stirrup 174, and it should accordingly be understood that Fig. 9 is intended to show the device as it is being assembled in position and not after operation as described above. After the device is blown free of the aircraft, water will be able to enter compartment 128 through openings 185 and 130, and the water-marking composition therein will begin to dissolve as described in connection with container 20. The same type of water-marking material described above in connection with container 20 has been found satisfactory for use with the embodiment of the invention shown in Figs. 9–11. The specific shape and size of shells 120 and 122 and the quantity of charge within chamber 128 may be varied to meet specific conditions in accordance with the principles discussed hereinabove in connection with container 20.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A device of the character described comprising, in combination, a supporting base, water-marking means, means normally securing said water-marking means in inoperative supported relation with said base means for disengaging said base and said water-marking means, and switch means effective to cause release of said securing means and including a housing defining a chamber provided with an open conduit leading from said chamber to the outside atmosphere, said switch responding to the presence of a predetermined volume of water in said chamber to cause the release of said securing means and thereby causing activation of said disengaging means.

2. A device of the character described comprising, in combination, a supporting base, a buoyant container of water-marking material, means normally securing said container in inoperative supported relation with said base, means for positively disengaging said container from said base, said securing means normally preventing operation of said disengaging means, and switch means for effecting release of said securing means and including a housing defining a chamber provided with an open conduit leading from said chamber to the outside atmosphere, said switch responding to the presence of a predetermined volume of water in said chamber to cause the release of said securing means and thereby causing activation of said disengaging means.

3. A device of the character described comprising, in combination, a supporting base, a buoyant container of water-marking material, means normally securing said container in inoperative supported relation with said base, means for positively disengaging said container from said base, said securing means normally preventing operation of said disengaging means, explosive means for effecting the release of said securing means upon detonation, and means responsive to the presence of water for detonating said explosive means and effecting the operation of said disengaging means.

4. A device of the character described comprising, in combination, a supporting base, a buoyant container of water-marking material, means normally securing said container in inoperative supported relation with said base, spring means adapted to disengage said container from said base means, said securing means normally holding said spring means under tension, explosive means for effecting the release of said securing means upon detonation, and means responsive to the presence of water for causing the detonation of said explosive means, said spring means thereupon operating to disengage said container from said base means.

5. A device of the character described comprising, in combination, a supporting base, a buoyant container of water-marking material, means normally securing said container in inoperative supported relation with said base, spring means adapted to disengage said container from said base means, said securing means normally holding said spring means under tension, explosive means for effecting the release of said securing means, and switch means for effecting detonation of said explosive means and including a housing defining a chamber provided with an open conduit leading from said chamber to the outside atmosphere, said switch responding to the presence of a predetermined volume of water in said chamber to cause the detonation of said explosive means, said spring means thereupon operating to disengage said container from said base means.

6. A device of the character described comprising, in combination, a supporting base, a buoyant container of water-marking material, means normally securing said container in inoperative supported relation with said base, means for positively disengaging said container from said base means, said securing means normally preventing operation of said disengaging means, and switch means for effecting the release of said securing means, said switch means comprising a housing defining an inner chamber and an outer chamber and means providing an open conduit between said inner and outer chamber and between said outer chamber and the outside atmosphere, said switch responding to the presence of a predetermined volume of water in said inner chamber to cause the release of said securing means and thereby causing activation of said disengaging means.

7. A device of the character described comprising, in combination, a supporting base, a buoyant container of water-marking material, means normally securing said container in inoperative supported relation with said base, spring means adapted to disengage said container from said base means, said securing means normally holding said spring means under tension, explosive means for effecting the release of said securing means, a housing defining an inner chamber and an outer chamber, means providing an open conduit between said inner and outer chambers and between said outer chamber and the outside atmosphere, and means in said inner chamber connected with said explosive means and responsive to the presence of a predetermined volume of water in said inner chamber to cause the detonation of said explosive means, said spring means thereupon operating to disengage said container from said base means.

8. A device of the character described comprising, in combination, a supporting base, a container provided with a water-tight compartment and a compartment of water-marking material, said last named compartment being approximately conical in shape and being provided with an opening adjacent the larger end thereof, means normally securing said container in inoperative supported relation with said base, means for positively disengaging said container from said base means, said securing means normally preventing operation of said disengaging means, and means responsive to the presence of water for releasing said securing means and thereby activating said disengaging means.

9. A device of the character described comprising, in combination, a supporting base, a container provided with a water-tight compartment and a compartment of water-marking material, said last named compartment being approximately conical in shape and being provided with an opening adjacent the larger end thereof, means normally securing said container in inoperative supported relation with said base, spring means adapted to disengage said container from said base means, said securing means normally holding said spring means under tension, explosive means for effecting the release of said securing means, and means responsive to the presence of water for causing the detonation of said explosive means, said spring means thereupon operating to disengage said container from said base means.

10. A device of the character described for use in producing a distinctively colored surface area on water and comprising a container provided with a plurality of compartments, one of said compartments being approximately conical in shape and provided with an opening adjacent the larger end thereof, said compartment having therein a solid water-marking composition of such characteristics as to dissolve in water at a predetermined rate per square inch of exposed area thereof, the other of said compartments being water-tight and of sufficient volume to cause said container to float at the surface of the water said conical compartment restricting the access of the water to the contents thereof to prevent progressive increase in the exposed surface area of said contents as dissolution proceeds and to extend the period required for complete dissolution.

11. A device of the character described comprising, in combination, a supporting base, a container provided with a water-tight compartment and a compartment of water-marking material, said last named compartment being approximately conical in shape and being provided with an opening adjacent the larger end thereof, means normally securing together said base means and said container in inoperative supported relation with said base, spring means adapted to disengage said container from said base means, said securing means normally holding said spring means under tension, explosive means for effecting the release of said securing means, a housing defining an inner chamber and an outer chamber, means providing an open conduit between said inner and outer chambers and between said outer chamber and the outside atmosphere, and means in said inner chamber connected with said explosive means and responsive to the presence of a predetermined volume of water in said inner chamber to cause the detonation of said explosive means, said spring means thereupon operating to disengage said container from said base means.

JAMES A. MacLEOD.

REFERENCES CITED

The following references are of record in the file of this patent:

UNITED STATES PATENTS

| Number | Name | Date |
|---|---|---|
| 1,836,495 | Paulson | Dec. 15, 1931 |
| 1,860,327 | Kuhn | May 24, 1932 |
| 1,993,341 | Gaffey | May 5, 1935 |
| 2,192,450 | Miller | Mar. 5, 1940 |
| 2,364,787 | Harrison et al. | Dec. 12, 1944 |
| 2,367,818 | Diehl | Jan. 23, 1945 |
| 2,389,160 | Manson et al. | Nov. 20, 1945 |